US009630528B2

(12) United States Patent
Takei et al.

(10) Patent No.: US 9,630,528 B2
(45) Date of Patent: Apr. 25, 2017

(54) OPERATING LEVER, SEAT DEVICE AND OPERATING SECTION STRUCTURE

(71) Applicant: TS TECH CO., LTD., Asaka-shi, Saitama (JP)

(72) Inventors: Hirotaka Takei, Shioya-gun (JP); Hiroshi Izawa, Shioya-gun (JP); Hiroyuki Hoshino, Shioya-gun (JP)

(73) Assignee: TS TECH CO., LTD., Asaka-shi (JP)

( * ) Notice: Subject to any disclaimer, the term of this patent is extended or adjusted under 35 U.S.C. 154(b) by 0 days.

(21) Appl. No.: 14/443,803

(22) PCT Filed: Nov. 18, 2013

(86) PCT No.: PCT/JP2013/081042
§ 371 (c)(1),
(2) Date: May 19, 2015

(87) PCT Pub. No.: WO2014/077389
PCT Pub. Date: May 22, 2014

(65) Prior Publication Data
US 2015/0306983 A1 Oct. 29, 2015

(30) Foreign Application Priority Data

Nov. 19, 2012 (JP) .................................. 2012-253499
Jan. 31, 2013 (JP) .................................. 2013-017104

(51) Int. Cl.
*B60N 99/00* (2006.01)
*B60N 2/16* (2006.01)
(Continued)

(52) U.S. Cl.
CPC ........... *B60N 2/1635* (2013.01); *B60N 2/165* (2013.01); *B60N 2/167* (2013.01); *B60N 2/168* (2013.01);
(Continued)

(58) Field of Classification Search
CPC ...... B60N 2/44; B60N 99/00; B60N 2002/44; B60N 2205/00; B60N 2/1635;
(Continued)

(56) References Cited

U.S. PATENT DOCUMENTS 7,959,229 B2 * 6/2011 Ishijima ............... B60N 2/0296
297/337
2009/0026791 A1 1/2009 Ishijima et al.
(Continued)

FOREIGN PATENT DOCUMENTS

CN 101835656 A 9/2010
CN 102317107 A 1/2012
(Continued)

OTHER PUBLICATIONS

May 19, 2015 International Preliminary Report on Patentability issued in International Patent Application No. PCT/JP2013/081042.
(Continued)

*Primary Examiner* — Philip Gabler
(74) *Attorney, Agent, or Firm* — Oliff PLC

(57) ABSTRACT

An operating lever includes a fixing portion, a handle, and an interface. The fixing portion is to be fixed to a power transmitter. The handle is to be gripped by a user. The interface connects the fixing portion and the handle. The fixing portion, the handle, and the interface are integrally formed. The interface has a weak portion at a portion other than the outer periphery of the interface, the weak portion being weaker than other portions.

13 Claims, 8 Drawing Sheets

(51) Int. Cl.
  *B60N 2/60* (2006.01)
  *G05G 1/04* (2006.01)
  *G05G 5/00* (2006.01)
(52) U.S. Cl.
  CPC ......... *B60N 2/1615* (2013.01); *B60N 2/6009* (2013.01); *G05G 1/04* (2013.01); *G05G 5/00* (2013.01)
(58) Field of Classification Search
  CPC .... B60N 2/6009; B60N 2/1615; B60N 2/165; B60N 2/167; B60N 2/168; G05G 1/04; G05G 5/00
  See application file for complete search history.

(56) References Cited

U.S. PATENT DOCUMENTS

| | | | | |
|---|---|---|---|---|
| 2010/0090515 | A1* | 4/2010 | Yamazaki | B60N 2/44 297/463.1 |
| 2010/0109406 | A1* | 5/2010 | Ueda | B60N 2/0296 297/358 |
| 2012/0313408 | A1* | 12/2012 | Nagata | B60N 2/4235 297/216.1 |

FOREIGN PATENT DOCUMENTS

| | | |
|---|---|---|
| JP | 2001-310660 A | 11/2001 |
| JP | 2007-196896 A | 8/2007 |
| JP | 2008-092987 A | 4/2008 |
| JP | 4116227 B2 | 7/2008 |

OTHER PUBLICATIONS

Jan. 7, 2014 International Search Report issued in International Patent Application No. PCT/JP2013/081042.

May 27, 2016 Office Action issued in Chinese Patent Application No. 201380060369.5.

Aug. 23, 2016 Office Action issued in Japanese Patent Application No. 2012-253499.

Feb. 15, 2017 Office Action issured in Chinese Application No. 201380060369.5.

* cited by examiner

OPERATING LEVER, SEAT DEVICE AND OPERATING SECTION STRUCTURE

TECHNICAL FIELD

The present invention relates to an operating lever, a seat device, and an operational structure, in particular, to a technology that prevents the application of excessive load to a power transmitter at the application of the excessive load to the operating lever mounted on the power transmitter.

BACKGROUND ART

A typical seat device for vehicles is equipped with a power transmitter, such as a height brake, for adjusting the position of the seating surface. The power transmitter is provided with an operating lever. The operating lever is vertically moved to drive the power transmitter, thereby adjusting the position of the seating surface of the seat device. Unfortunately, if a force greater than the expected is applied to the operating lever, it may be also applied to the power transmitter.

Recently, a technology has been developed that prevents the application of a force greater than a predetermined level to the power transmitter by providing a torque limiter on the operating lever (see, for example, Patent Document 1). More specifically, an operating lever consists of a body of the lever and a grip. A first U-shaped spring groove extends along the side surface near the tips of the body of the lever. A second U-shaped spring groove extends along the side surface near the roots of the grip. The ends of the first U-shaped spring groove face the ends of the second U-shaped spring groove. The operating lever is assembled by coupling each end of the first U-shaped spring groove to the corresponding end of the second U-shaped spring groove with a hinge. The operating lever includes a torque limiter. The torque limiter is formed by an elongated and thin flat spring. The flat spring has a curved surface along a width direction thereof. The flat spring is disposed between the first and second U-shaped spring grooves, which are formed in the body of the lever and the grip, respectively, such that the curved concave surface faces the exterior. The flat spring is wound along the first and second U-shaped spring grooves as needed and is fastened so as not to be loosened.

According to the technology disclosed in Patent Document 2, a lower rail (26) is provided on the floor of a passenger compartment. An upper rail (24) is provided along the lower rail (26) such that it can move in the front-back direction. A bottom seat (seat device cushion 12) is disposed above the upper rail (24). A shift lifter (22) is disposed between the upper rail (24) and the bottom seat (12). A backrest (seat device back 14) is erected at the rear end of the bottom seat (12). The seat lifter (22) lifts up or lowers the bottom seat (12). The side surface of the bottom seat (12) is covered with a cover (42). The seat lifer (22) is disposed on the interior of the cover (42) and covered with the cover (42). An operating lever (32) is disposed on the exterior of the cover (42). The operating lever (32) has a rear end (32A) which bulges outward. A power input member (22G) of the seat lifter (22) extends through the cover (42) from the interior to the exterior. The rear end (32A) of the operating lever (32) is coupled to the power input member (22G) of the seat lifter (22) outside of the cover (42). When a user pulls up the operating lever (32), the seat lifter (22) lifts up the bottom seat (12). When the user presses down the operating lever (32), the seat lifter (22) lowers the bottom seat (12). Unfortunately, the technology disclosed in Patent Document 2 cannot stabilize the posture of the operating lever (32) because of its long length and vibrates in the right-left direction around the rear end of the operating lever (32). At the operation of the operating lever (32) by the user, the operating lever (32) is interfered by the cover (42). In other words, the operating lever (32) comes into contact with the cover (42) or generates friction with the cover (42) to cause resistance to the movement of the operating lever (32).

PRIOR ART DOCUMENT

Patent Document

Patent Document 1: Japanese Patent Laid-Open Publication No. 2001-310660

Patent Document 2: Japanese Patent Laid-Open Publication No. 2007-196896

SUMMARY OF INVENTION

Problem to be Solved by the Invention

The operating lever equipped with a torque limiter, as disclosed in Patent Document 1, has a complicated structure and thus precludes a reduction in manufacturing cost. The operating lever has a gap between the body of the lever and the grip. The gap may cause a slight deformation of the grip relative to the body of the lever during a normal operation. Such a deformation gives an uncomfortable sense.

An object of the present invention, which has been made to solve this problem, is to provide a simple structure that can prevent the application of a force greater than a predetermined level to the power transmitter and thus prevent an uncomfortable sense during a normal operation.

Means for Solving the Problem

To solve the above problem, one aspect of the embodiment discloses an operating lever comprising: a fixing portion to be fixed to a power transmitter; a handle to be griped by a user; and an interface connecting the fixing portion and the handle, wherein the fixing portion, the handle, and the interface are integrally formed, and the interface has a weak portion at a portion other than the outer periphery of the interface, the weak portion being weaker than other portions.

One aspect of the embodiment discloses the operating lever, wherein the interface comprises: an interface main body along a plane orthogonal to a rotary shaft of the power transmitter; an interface upper flange erected from an upper edge of the interface main body; an interface lower flange erected from a lower edge of the interface main body; and a rib residing between the interface upper flange and the interface lower flange, the rib extending from an end of the interface on a side nearer to the fixing portion to a middle of the interface, and wherein the weak portion resides in the vicinity of an end of the rib on a side nearer to the handle.

One aspect of the embodiment discloses the operating lever, wherein multiple cylindrical holes are densely formed in the rib.

One aspect of the embodiment discloses the operating lever, wherein the fixing portion, the handle and the interface are composed of resin, and wherein an end of the rib on a side nearer to the interface upper flange is more apart from a vertical line extending through the rotary shaft of the power transmitter than an end of the rib on a side nearer to the interface lower flange.

One aspect of the embodiment discloses the operating lever, wherein the handle comprises: a handle main body continuous from the interface main body, the handle main body being along the plane orthogonal to the rotary shaft of the power transmitter; a handle upper flange continuous from the interface upper flange, the handle upper flange being erected from an upper edge of the handle main body; a handle lower flange continuous from the interface lower flange, the handle lower flange erected from a lower edge of the handle main body; and an auxiliary flange extending from a lower end of the handle lower flange and being substantially parallel with the handle main body.

One aspect of the embodiment discloses the operating lever, wherein the fixing portion comprises a first wall surrounding the entire circumference of the power transmitter and a second wall surrounding the entire circumference of the first wall, and wherein multiple ribs are provided between the first wall and the second wall at predetermined intervals and continuous from the first wall and the second wall.

One aspect of the embodiment discloses an operational structure, comprising: the operating lever; a cover covering a side of a seat body; an multiple projections residing on a front surface of the cover, wherein the operating lever is mounted on the cover and is movable vertically along the front surface of the cover, and wherein the operating lever overlaps with the multiple projections in side view of the cover and the operating lever.

One aspect of the embodiment discloses the operational structure, wherein the operating lever extends forwardly along the front surface of the cover from a fulcrum of a vertical movement of the operating lever, and wherein the multiple projections comprise: a first projection disposed on the front surface of the cover forward of the fulcrum and extending vertically; and a second projection disposed on the front surface of the cover forward of the first projection and extending vertically.

One aspect of the embodiment discloses the operational structure, wherein an upper end of the first projection is vertically offset to an upper end of the second projection.

One aspect of the embodiment discloses the operational structure, wherein the operating lever is curved upward while extending forwardly, wherein the upper end of the second projection is above the upper end of the first projection.

One aspect of the embodiment discloses the operational structure, wherein a lower end of the first projection is vertically offset to a lower end of the second projection.

One aspect of the embodiment discloses the operational structure, wherein the operating lever extends forwardly along the front surface of the cover from a fulcrum of a vertical movement of the operating lever, the operating lever is movable vertically from an original position and is urged so as to return to the original position, the multiple projections extend vertically, and the operating lever hides at least one of the multiple projections and partially exposes the at least one of the multiple projections extending below the operating lever at the original position of the operating lever.

One aspect of the embodiment discloses the operational structure, wherein the operating lever extends forwardly along the front surface of the cover from a fulcrum of a vertical movement of the operating lever, the operating lever is movable vertically from an original position, the multiple projections extend vertically, and the operating lever overlaps with at least one of the multiple projections even at the highest position of the operating lever in side view of the cover and the operating lever.

One aspect of the e,bodiment discloses the operational structure, wherein the operating lever extends forwardly along the front surface of the cover from a fulcrum of a vertical movement of the operating lever, the operating lever is movable vertically from an original position, the multiple projections extend vertically, and the operating lever overlaps with at least one of the multiple projections even at the lowest position of the operating lever in side view of the cover and the operating lever.

One aspect of the embodiments dicloses a seat device comprising: the seat body; and the operational structure.

Effects of Invention

According to the invention of claim 1, a weak portion, which is weaker than other portion, resides at a portion other than the outer periphery of the interface connecting the fixing portion and the handle. Large load applied to the operating lever is prevented from being transmitted to the power transmitter by the deformation of the weak portion.

Since the weak portion resides at a portion other than the outer periphery of the interface, no gap is formed in the outer periphery of the interface caused by the weak portion. This configuration can prevent an uncomfortable sense to the user during a normal operation.

Since the fixing portion, the handle and the interface are integrally formed, it is possible to provide an operating lever having a simpler structure than before.

According to the invention of claim 2, the rib is formed between the interface upper flange and the interface lower flange, wherein the rib extends from an end of the interface main body on a side nearer to the fixing portion to the middle of the interface main body. This configuration can enhance the strength of the joint between the interface and the fixing portion. Stress inevitably concentrates on the joint between the interface and the fixing portion during a normal operation. The enhanced strength of this portion suppresses a deformation during the normal operation.

According to the invention of claim 3, cylindrical holes are densely formed in the rib. This configuration can retain the strength of the rib while reducing the amount of material used for the operating lever.

According to the invention of claim 4, an end of the rib on a side nearer to the interface upper flange is more apart from a vertical line extending through the rotary shaft of the power transmitter than an end of the rib on a side nearer to the interface lower flange. During the deformation of the weak portion, force acting so as to twist the plane orthogonal to the rotary shaft of the power transmitter is applied to the power transmitter through the fixing portion. Thus, force applied to the power transmitter is suppressed while the weak portion is deformed, and thus, transmission of large force to the power transmitter can further be suppressed.

According to the invention of claim 5, the handle includes an auxiliary flange extending from a lower end of the handle lower flange and being substantially parallel with the handle main body. This configuration enhances the entire rigidity of the handle and the strength of the handle.

According to the invention of claim 6, multiple ribs are disposed at predetermined intervals between the first wall surrounding the entire circumference of the power transmitter and the second wall surrounding the entire circumference of the first wall such that the ribs are continuous with the first wall and the second wall. This configuration enhances the rigidity of the fixing portion itself and ensures a smooth transmission of power to the power transmitter during a normal operation.

According to the invention of claim 7, multiple projections are disposed on the front surface of the cover. These projections can prevent a large-area contact of the operating lever with the front surface of the cover. This configuration can reduce the friction applied to the operating lever during operation of the operating lever and ensure a stable and smooth movement of the operating lever.

According to the invention of claim 8, the operating lever extends forwardly from the fulcrum thereof. The first projection and the second projection are disposed forward of the fulcrum in the front-back direction. This configuration can further prevent a large-area contact of the operating lever with the front surface of the cover and ensures a smooth movement of the operating lever.

According to the invention of claim 9, the upper end of the first projection is vertically offset from the upper end of the second projection. The vertical range of the first projection differs from the vertical range of the second projection. This configuration can expand the noncontact area of the operating lever with the front surface of the cover and thus the smoothly movable area of the operating lever.

According to the invention of claim 10, the upper end of the second projection is above the upper end of the first projection. The operating lever overlaps with the second projection, even if the operating lever curves upward while extending forwardly. This configuration can expand the noncontact area of the operating lever with the front surface of the cover and thus the smoothly movable area of the operating lever.

According to the invention of claim 11, the lower end of the first projection is vertically offset from the lower end of the second projection. The vertical range of the first projection differs from the vertical range of the second projection. This configuration can expand the noncontact area of the operating lever with the front surface of the cover and thus the smoothly movable area of the operating lever.

According to the invention 12, at the original position of the operating lever, the operating lever hides at least one of multiple projections. The operating lever partially exposes the same projection below the lower edge of the operating lever, which makes the projection less conspicuous. This configuration enhances the appearance or aesthetic properties of the cover.

According to the invention of claim 13, even at the highest position of the operating lever, the operating lever does not come into contact with the front surface of the cover. This configuration can ensure a stable movement of the operating lever from the original position to the highest position of the operating lever.

One aspect of the embodiment discloses that, even at the lowest position of the operating lever, the operating lever does not come into contact with the front surface of the cover. This configuration can ensure a stable movement of the operating lever from the original position to the lowest position of the operating lever.

DESCRIPTION OF EMBODIMENTS

Embodiments of the present invention will now be described with reference to the accompanying drawings. Although the following embodiments include various limitations that are technically preferred in the practice of the present invention, the scope of the present invention should not be limited to the embodiments or illustrated examples.

Figure 1:
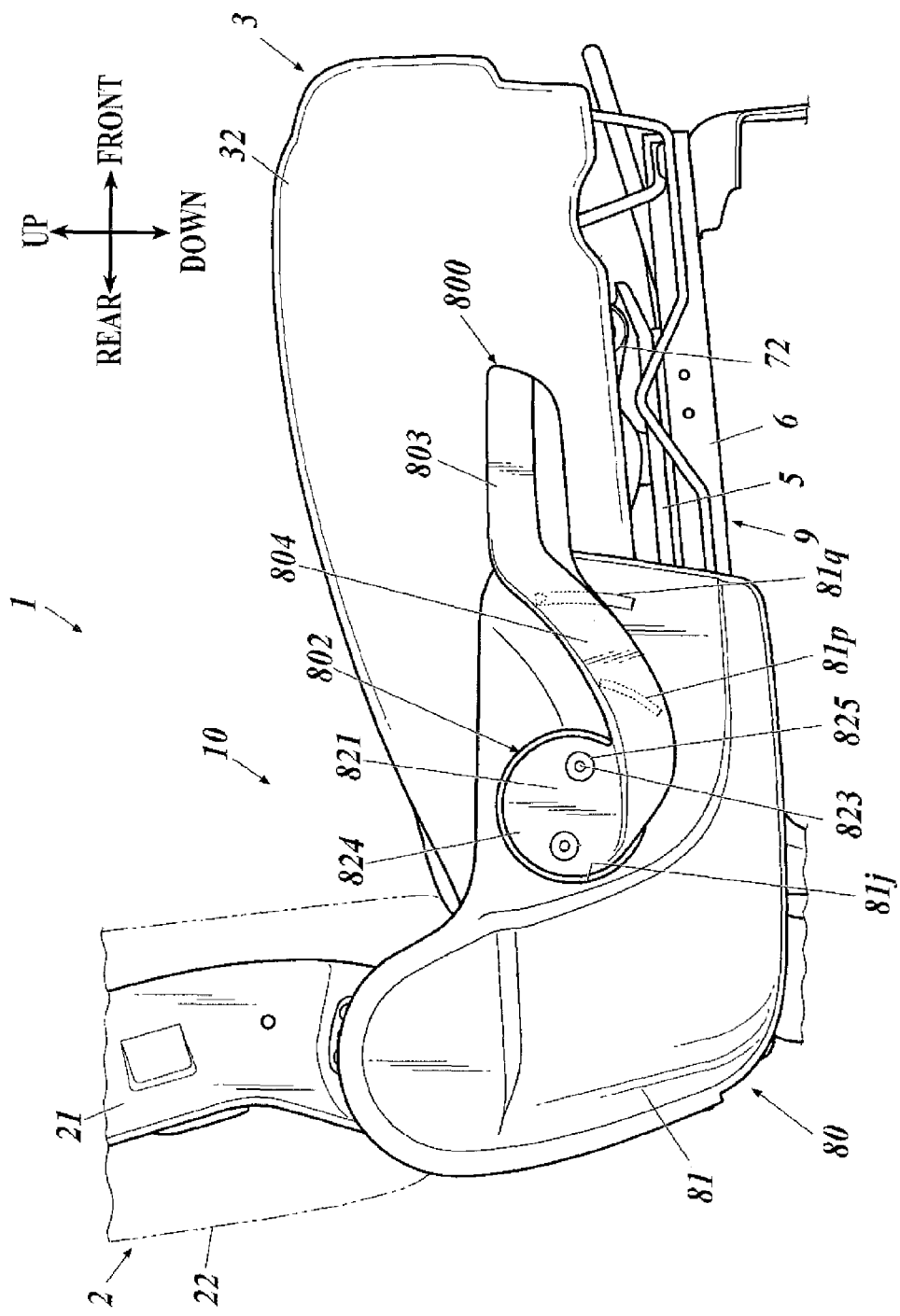
FIG. 1 is a side view of a seat device according to one embodiment of the present invention.
Figure 2:
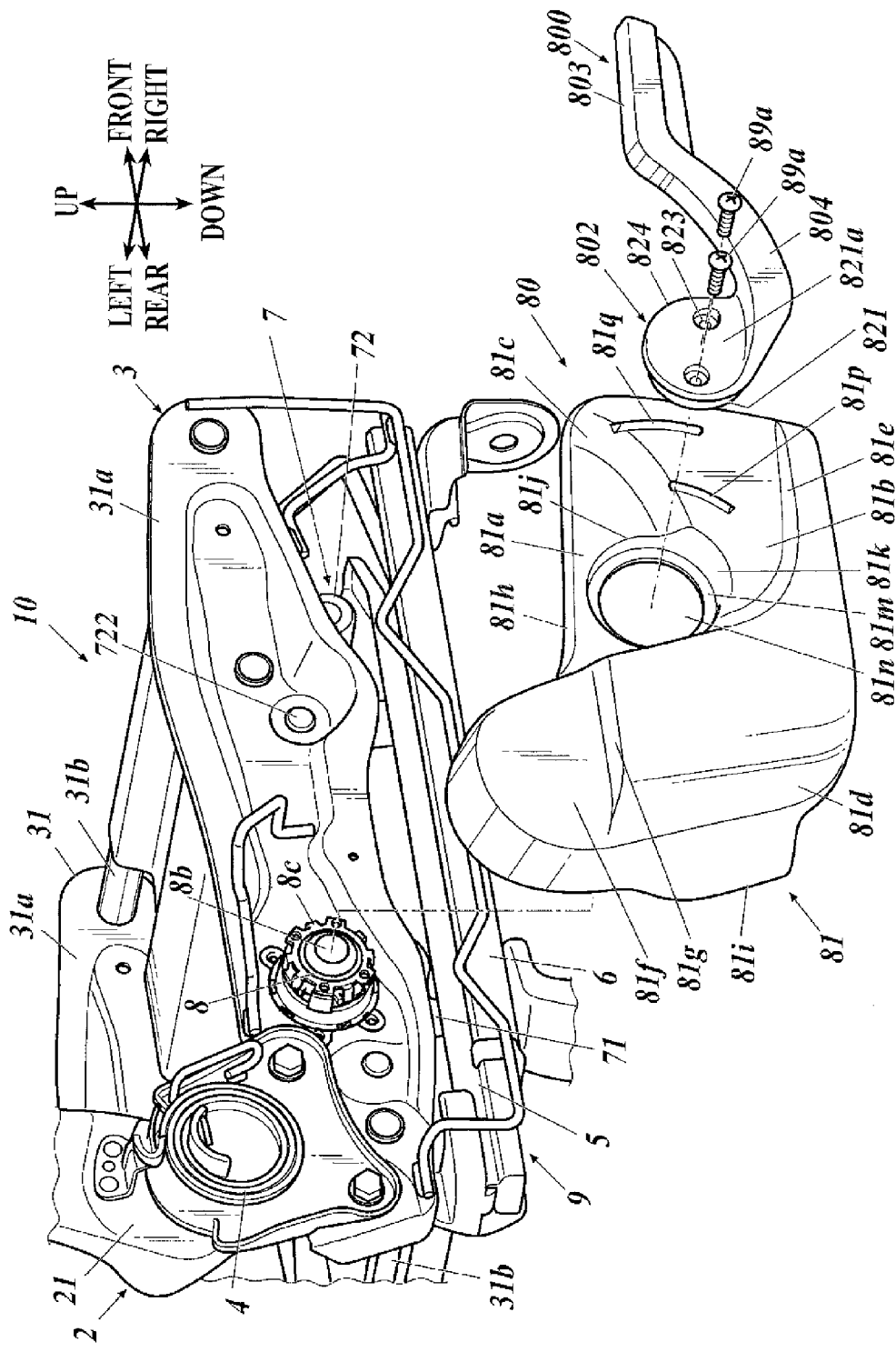
FIG. 2 is an exploded perspective view of the seat device according to the embodiment of the present invention.

FIG. 1 is a side view of a seat device 1. FIG. 2 is an exploded perspective view of the seat device 1. In the following description, when a person views the seat device 1 from its back face, the side of the seat device 1 adjacent to the right hand of the person is referred to as the right or right side of the seat device 1 and the side adjacent to the left hand of the person is referred to as the left side of the seat device 1.

As shown in FIGS. 1 and 2, the seat device 1 includes a seat body 10, a position adjuster (slide rail) 9, a lifting mechanism (height adjuster) 7, and an operational structure 80.

The position adjuster 9 adjusts the position in the front-back direction of the seat body 10. The position adjuster 9 includes a pair of right and left supports (upper rails) 5 and a pair of right and left slide rails (lower rails) 6.

The right and left slide rails 6 extend in the front-back direction. The slide rails 6 are disposed in parallel with each other and fixed to the floor of a passenger compartment. The right and left supports 5 also extends in the front-back direction. Each support 5 is slidably disposed in the front-back direction on the corresponding slide rail 6. The support 5 is guided along the slide rail 6 in the front-back direction. A locking mechanism is provided between the support 5 and the slide rail 6 to lock or unlock the support 5 and the slide rail 6 through user operation of the locking mechanism.

The seat body 10 includes a backrest 2, a bottom seat 3, and a recliner mechanism 4. The backrest 2 is erected and coupled to the rear end of the bottom seat 3 through the recliner mechanism 4. The recliner mechanism 4 allows the backrest 2 to tilt in the front-back direction.

The bottom seat 3 supports the buttocks and thighs of a seated person from the bottom. The bottom seat 3 includes a frame 31, a pad 32 and a skin (not shown). The frame 31 functions as a framework of the bottom seat 3. The pad 32 wraps the left, right, front and top sides of the frame 31. The pad 32 is made of foamed resin and has cushioning properties. The skin covers the pad 32.

The frame 31 includes a pair of left and right frame segments 31a and a pair of front and back tie bars 31b. The side frame segments 31a face each other in the right-left direction. The front tie bar 31b is bridged between the fronts of the right and left frame segments 31a. The rear tie bar 31b is bridged between the rears of the right and left frame segments 31a.

The backrest 2 supports the upper body of a seated person from the rear. The backrest 2 includes a frame 21, a pad 22, and a skin (not shown). The frame 21 of the backrest 2 is rectangular in the front view. The pad 22 wraps the left, right, front and top sides of the frame 21. The frame 21 functions as a framework of the backrest 2. The pad 22 is made of foamed resin having cushioning properties. The skin covers the pad 22.

The frame 21 has lower portions coupled to the rears of the frame 31 of the bottom seat 3 through the recliner mechanism 4. The recliner mechanism 4 is provided at the rear of a side frame segment 31a of the frame 31. The recliner mechanism 4 allows the frame 21 to tilt in the front-back direction around the lower portion of the frame 21. The recliner mechanism 4 locks the frame 21 to the frame 31 to stop tilting of the frame 21. The frame 21 is urged forward to return to the erecting position.

A lifting mechanism 7 is provided on the bottom of the seat body 10. The lifting mechanism 7 is coupled to the seat body 10, in particular, to the bottom seat 3, and to each support 5. The lifting mechanism 7 lowers the seat body 10 toward the support 5 and lifts up the seat body 10 away from the support 5.

Figure 3:
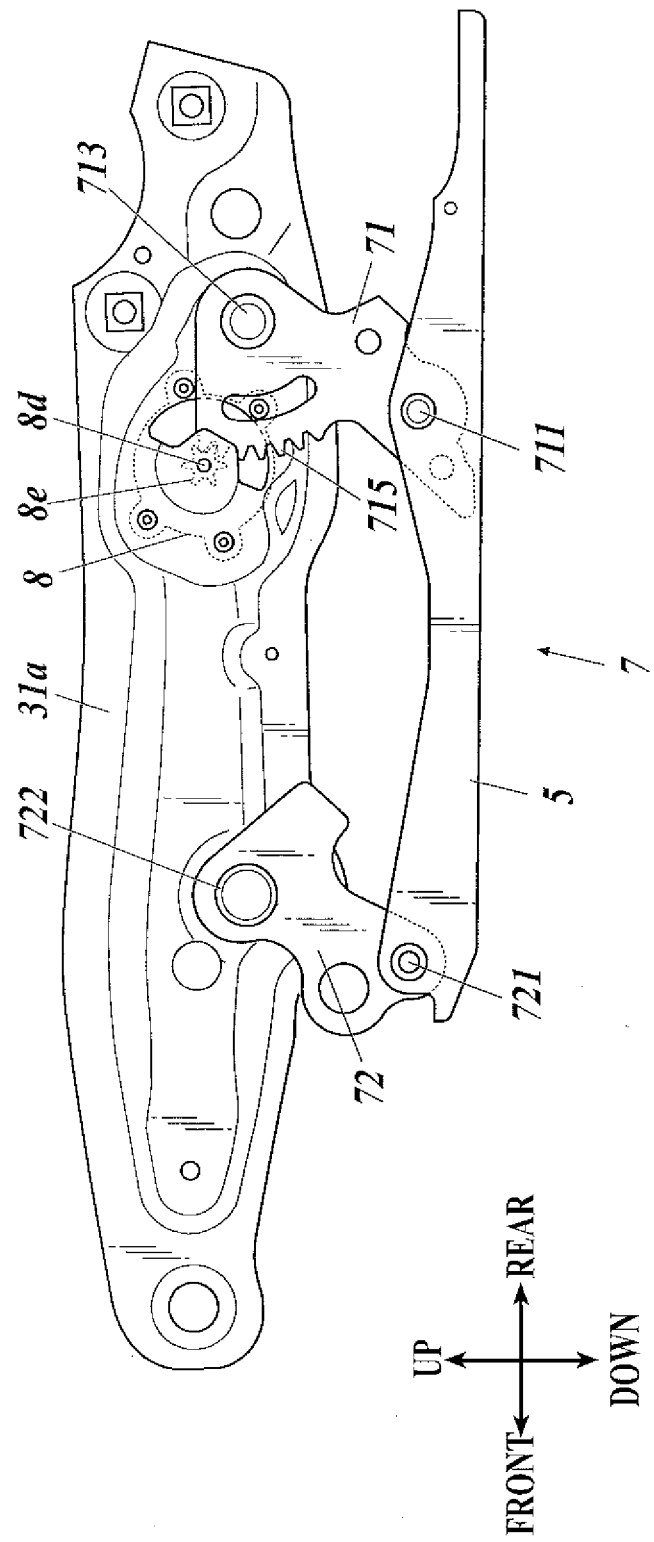
FIG. 3 is a side view of a lifting mechanism according to the embodiment of the present invention.

FIG. 3 is a side view of the lifting mechanism 7. The lifting mechanism 7 is disposed on each of the right and left frame segments 31a. The lifting mechanisms 7 are substantially symmetrically about a vertical plane extending through midpoints between the side frame segments 31a. FIG. 3 illustrates the lifting mechanism 7 disposed on the right frame segment 31a, viewed from the interior of the seat body 10.

The lifting mechanism 7 is a four-bar linkage. The lifting mechanism 7 includes a pair of left and right rear linkage members 71, front linkage members 72, and joints 711, 713, 721 and 722.

Each rear linkage member 71 has a rack 715. The rear linkage member 71 has one end (lower end) coupled to the rear of the corresponding support 5 via the joint 711. The rear linkage member 71 has another end (upper end) coupled to the rear of the corresponding side frame segment 31a via the joint 713. Each front linkage member 72 has one end (lower end) coupled to the front end of the support 5 via the joint 721. The front linkage member 72 has another end (upper end) coupled to the front of the side frame segment 31a via the joint 722. The joints 711, 713, 721, and 722 serve as rotary shafts, which extend in the right-left direction. The rear linkage member 71 and the support 5 are pivotable around the joint 711. The rear linkage member 71 and the side frame segment 31a are pivotable around the joint 713. The front linkage member 72 and the support 5 are pivotable around the joint 721. The front linkage member 72 and the side frame segment 31a are pivotable around the joint 722. The linkage members 71 and 72 rise forward around the joints 711 and 721, respectively, to lift up the bottom seat 3. The linkage members 71 and 72 fall back around the joints 711 and 721, respectively, to lower the bottom seat 3.

The operational structure 80 operates the lifting mechanisms 7. The operational structure 80 also protects one side surface of the seat body 10.

The operational structure 80 includes a power transmitter (height brake) 8, a cover 81, and an operating lever 800.

The power transmitter 8 transmits torque and power of the operating lever 800 to the seat body 10 via the lifting mechanism 7. In other words, the torque and power of the operating lever 800 is transmitted by the power transmitter 8 to the lifting mechanism 7. The lifting mechanism 7 is driven to lift up the seat body 10.

Figure 4:
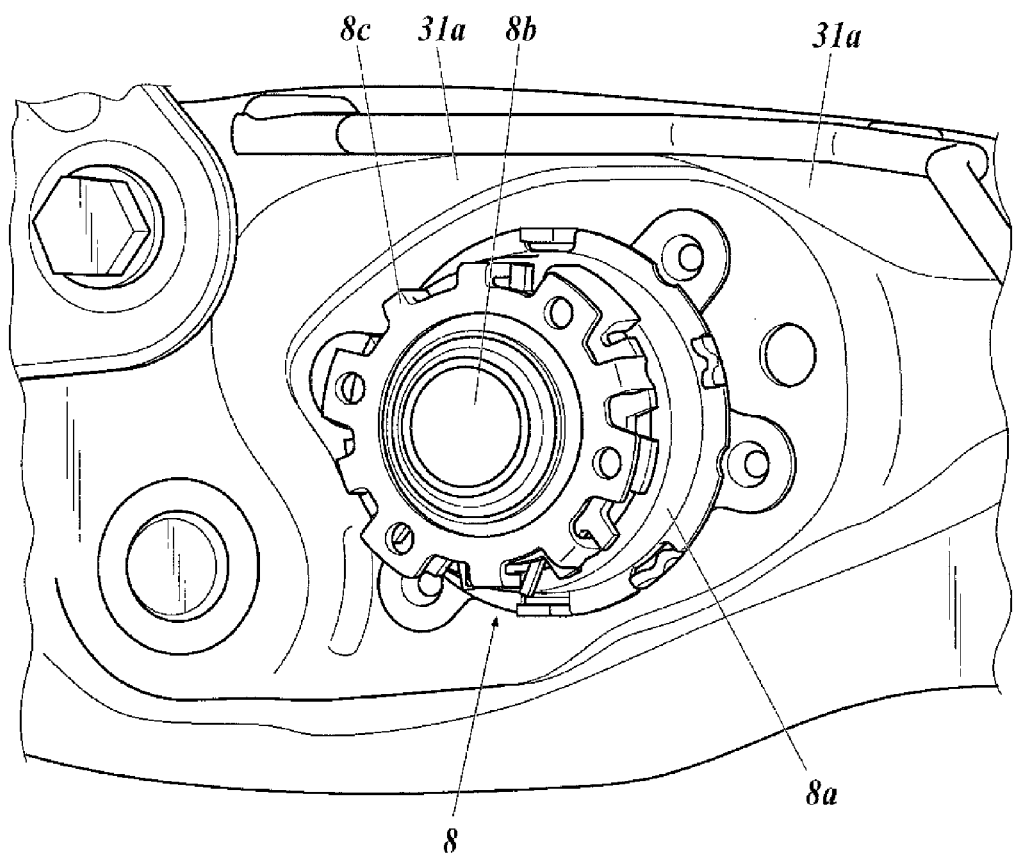
FIG. 4 is an enlarged perspective view of a side surface of a seat body according to the embodiment of the present invention.

FIG. 4 is an enlarged perspective view of a side surface of the seat body 10. As shown in FIG. 4, the power transmitter 8 is disposed on one side surface of the seat body 10. More specifically, the power transmitter 8 is mounted on one side of the frame 31 of the bottom seat 3 (the outer surface of the right frame segment 31a).

The power transmitter 8 may be disposed on the outer surface of the left frame segment 31a. For example, for a seat body 10 of the left seat in a passenger compartment, the power transmitter 8 is disposed on the outer surface of the left frame segment 31a. For a seat body 10 of the right seat in the passenger compartment, the power transmitter 8 is disposed on the outer surface of the right frame segment 31a.

As shown in FIGS. 3 and 4, the power transmitter 8 includes a housing 8a, an input shaft (first rotary shaft) 8b, a bracket 8c, an output shaft (second rotary shaft) 8d, a drive gear 8e, and a mechanical section (not shown).

The housing 8a is mounted on the outer surface of the right frame segment 31a with fasteners, such as screws, bolts, and rivets, or by welding. The mechanical section is disposed in the housing 8a and coupled to the input shaft 8b and the output shaft 8d within the housing 8a. The input shaft 8b extends from the interior to the exterior of the housing 8a. The output shaft 8d extends from the interior to the exterior of the housing 8a. The extending direction of the output shaft 8d is reverse to that of the input shaft 8b; the input shaft 8b extends toward the exterior of the side frame segment 31a; the output shaft 8d extends toward the interior of the side frame segment 31a. The input shaft 8b and the output shaft 8d are disposed concentrically. The input shaft 8b is coupled to the bracket 8c. The bracket 8c is coupled to the operating lever 800. The output shaft 8d is coupled to the drive gear 8e. The drive gear 8e engages with the rack 715 of the rear linkage member 71. The "axial direction" refers to the extending direction of the input shaft 8b and the output shaft 8d; the "radial direction" refers to the direction perpendicular to the input shaft 8b and the output shaft 8d; and the "circumferential direction" refers to a circumferential direction around the input shaft 8b and the output shaft 8d, unless otherwise specified.

Upon receipt of torque of the output shaft 8d, the mechanical section, disposed in the housing 8a, retains the circumferential position of the output shaft 8d and does not transmit the torque of the output shaft 8d to the input shaft 8b. This prevents the transmission of torque and power from the drive gear 8e to the operating lever 800.

The mechanical section transmits torque from the input shaft 8b to the output shaft 8d to rotate the output shaft 8d in the same direction as (or reverse direction to) that of the input shaft 8b. When the operating lever 800 is rotated upward, the mechanical section of the power transmitter 8 transmits the torque and power from the operating lever 800 to drive gear 8e to drive the lifting mechanism 7. The lifting mechanism 7 lifts up the bottom seat 3. When the operating lever 800 is rotated downward, the mechanical section of the power transmitter 8 transmits torque and power from the operating lever 800 to drive gear 8e to drive the lifting mechanism 7. The lifting mechanism 7 lowers the bottom seat 3.

The mechanical section actuates the input shaft 8b such that the input shaft 8b keeps its circumferential position at an original position (neutral position) and does not transmit the actuation force to the output shaft 8d. When the operating lever 800 is released after the lever is pulled up or pressed down, the input shaft 8b returns to the original position and the operating lever 800 returns its original position (see FIG.

1). Thus, the input shaft 8*b* works as a fulcrum of the operating lever 800. The operating lever 800 can move vertically from the original position and is actuated by the mechanical section such that the operating lever 800 returns to the original position. When the input shaft 8*b* and the operating lever 800 return to their original positions, the output shaft 8*d* remains stationary and does not rotate.

As shown in FIGS. 1 and 2, the side of the seat body 10 is covered with the cover 81. More specifically, the cover 81 covers the side extending from a lateral portion to a rear portion of the bottom seat 3, the side extending from a lateral portion to a lower portion of the backrest 2, and the recliner mechanism 4. The cover 81 is mounted on the seat body 10 while it covers the side of the seat body 10.

The cover 81 is formed of resin. The cover 81 includes design panels 81*a*, 81*b*, 81*c*, 81*d*, 81*e*, 81*f*, and 81*g* and flanges 81*h* and 81*i*. The design panels 81*a*, 81*b*, 81*c*, 81*d*, 81*e*, 81*f*, and 81*g* constitute the front of the cover 81.

A first design panel 81*a* extends vertically from the front to the rear. The first design panel 81*a* is disposed outside the side frame segment 31*a* such that the first design panel 81*a* faces the side frame segment 31*a* in the right-left direction.

A second design panel 81*b* is disposed below the first design panel 81*a*. The second design panel 81*b* extends vertically from the front to the rear. The second design panel 81*b* is disposed outside the side frame segment 31*a* such that the second design panel 81*b* faces the side frame segment 31*a* in the right-left direction. The second design panel 81*b* protrudes laterally more than the first design panel 81*a*. The first design panel 81*a* and the second design panel 81*b* form a step.

A third design panel 81*c* is disposed between the lower edge of the front of the first design panel 81*a* and the upper edge of the front of the second design panel 81*b*. The third design panel 81*c* is formed into an arch that slopes upward toward the front in side view. The third design panel 81*c* is continuous from the first design panel 81*a* and the second design panel 81*b*. The third design panel 81*c* is inclined with respect to the first design panel 81*a* and the second design panel 81*b*.

A fourth design panel 81*d* extends below the second design panel 81*b* and behind the second design panel 81*b* and the first design panel 81*a*. The fourth design panel 81*d* has an L shape (hook shape) in side view. The fourth design panel 81*d* is disposed outside the side frame segment 31*a*. The fourth design panel 81*d* faces the side frame segment 31*a* in the right-left direction. The fourth design panel 81*d* protrudes laterally more than the first design panel 81*a*. The fourth design panel 81*d* and the first design panel 81*a* form a step. The fourth design panel 81*d* protrudes laterally more than the second design panel 81*b*. The fourth design panel 81*d* and the second design panel 81*b* form a step.

A fifth design panel 81*e* extends below the second design panel 81*b* and behind the second design panel 81*b* and the first design panel 81*a*. The fifth design panel 81*e* is disposed between the first design panel 81*a* and the fourth design panel 81*d* and between the second design panel 81*b* and the fourth design panel 81*d*. The fifth design panel 81*e* is continuous from the first design panel 81*a*, the second design panel 81*b*, and the fourth design panel 81*d*. The fifth design panel 81*e* is inclined with respect to the first design panel 81*a*, the second design panel 81*b*, and the fourth design panel 81*d*.

A sixth design panel 81*f* is disposed above the fourth design panel 81*d*. The sixth design panel 81*f* extends vertically from the front to the rear. The sixth design panel 81*f* is disposed outside the frame 21 of the backrest 2. The sixth design panel 81*f* faces the side of the frame 21 in the right-left direction. The fourth design panel 81*d* protrudes laterally more than the sixth design panel 81*f*. The fourth design panel 81*d* and the sixth design panel 81*f* form a step.

A seventh design panel 81*g* is disposed between the lower edge of the sixth design panel 81*f* and the upper edge of the fourth design panel 81*d*. The seventh design panel 81*g* is continuous from the sixth design panel 81*f* and the fourth design panel 81*d*. The seventh design panel 81*g* is inclined with respect to the sixth design panel 81*f* and the fourth design panel 81*d*.

A flange 81*h* extends leftward (toward the interior of the seat body 10) from the upper edge of the first design panel 81*a*. The flange 81*h* extends in the front-back direction in top view. The flange 81*i* extends leftward (toward the interior of the seat body 10) from the front, upper, and rear edges of the sixth design panel 81*f* and the rear edge of the fourth design panel 81*d*.

A receiving recess 81*j* and a through-hole 81*n* are formed on the cover 81, in particular, on the first design panel 81*a* of the cover 81. The receiving recess 81*j* is formed below the first design panel 81*a*. The upper edge of the second design panel 81*b* is partially along the edge of the receiving recess 81*j*.

The receiving recess 81*j* is indented on the front surface (exterior) of the cover 81 such that the back side of receiving recess 81*j* protrudes from the back (interior) side of the cover 81. The receiving recess 81*j* has a cylindrical shape having a cylindrical wall 81*k* surrounding the periphery of the receiving recess 81*j*. The cylindrical wall 81*k* protrudes from the back side of the cover 81.

A flange 81*m* is formed on the inner peripheral surface of the cylindrical wall 81*k*. The flange 81*m* extends radially inward from the inner peripheral surface of the cylindrical wall 81*k*. The flange 81*m* forms a bottom of the receiving recess 81*j*. The through-hole 81*n* extends from the bottom of the receiving recess 81*j* to the back side of the cover 81 and is surrounded by the flange 81*m*. The through-hole 81*n* faces the power transmitter 8.

Two projections 81*p* and 81*q* are disposed on the surface of the cover 81. More specifically, the projections 81*p* and 81*q* are disposed on the second design panel 81*b* of the cover 81.

The first projection 81*p* resides forward of the receiving recess 81*j* and the through-hole 81*n*. The second projection 81*q* resides forward of the first projection 81*p*. The first projection 81*p* is apart from the second projection 81*q* in the front-back direction. The first projection 81*p* is disposed between the second projection 81*q* and the through-hole 81*n* in the front-back direction. The second projection 81*q* is disposed near the front end of the front of the cover 81.

The projections 81*p* and 81*q* extend vertically along the circumferential direction around the center of the through-hole 81*n* (the axial center of the power transmitter 8). The projections 81*p* and 81*q* are each formed into an arch around the center of the through-hole 81*n*.

The upper end of the projection 81*p* is vertically offset from the upper end of the projection 81*q*. The lower end of the projection 81*p* is vertically offset from the lower end of the projection 81*q*. The projections 81*p* and 81*q* are at least partially disposed at different vertical positions. More specifically, the upper end of the first projection 81*p* is below the upper end of the second projection 81*q*. The lower end of the first projection 81*p* is below the lower end of second projection 81*q*.

The upper end of the first projection 81*p* is above the lower end of the second projection 81*q*. The first projection 81p and the second projection 81q overlap with each other in the vertical range from the upper end of the first projection 81p to the lower end of the second projection 81q. The upper end of the first projection 81p may be above the lower end of the second projection 81q. Alternatively, the vertical position of the upper end of the first projection 81p may align with the vertical position of the lower end of the second projection 81q. In this case, the first projection 81p does not overlap with the second projection 81q; the projections 81p and 81q are substantially disposed at different vertical positions.

Figure 5:
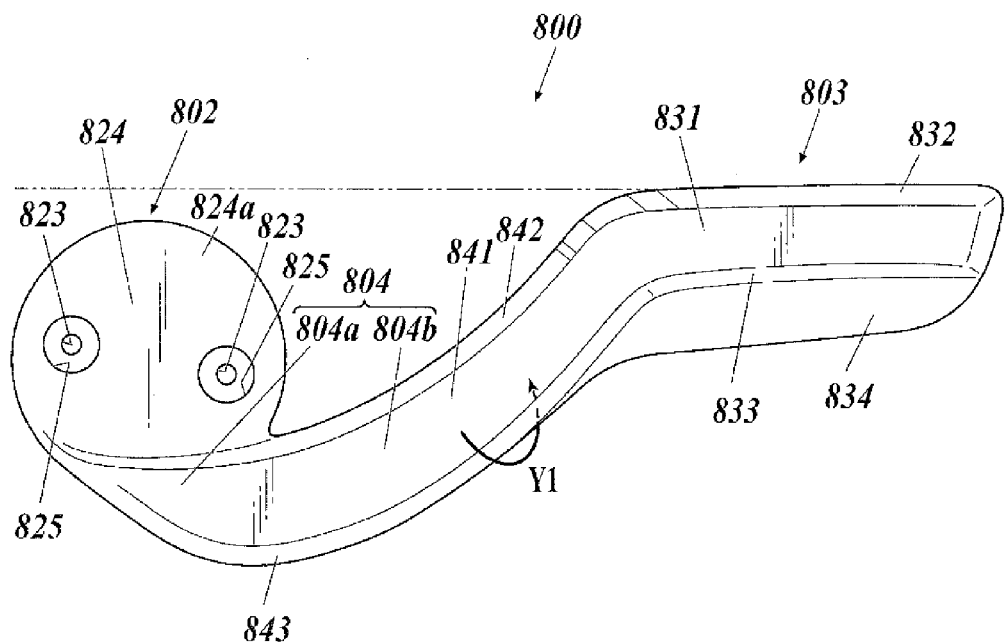
FIG. 5 is an external side view of an operating lever according to the embodiment of the present invention.
Figure 6:
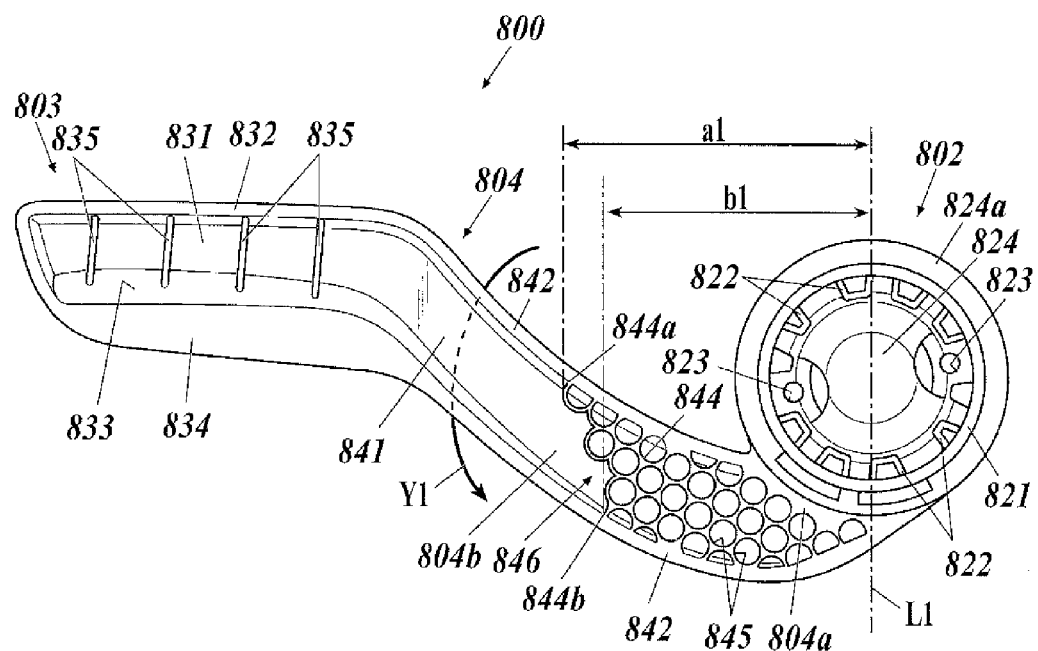
FIG. 6 is an internal side view of the operating lever according to the embodiment of the present invention.
Figure 7:
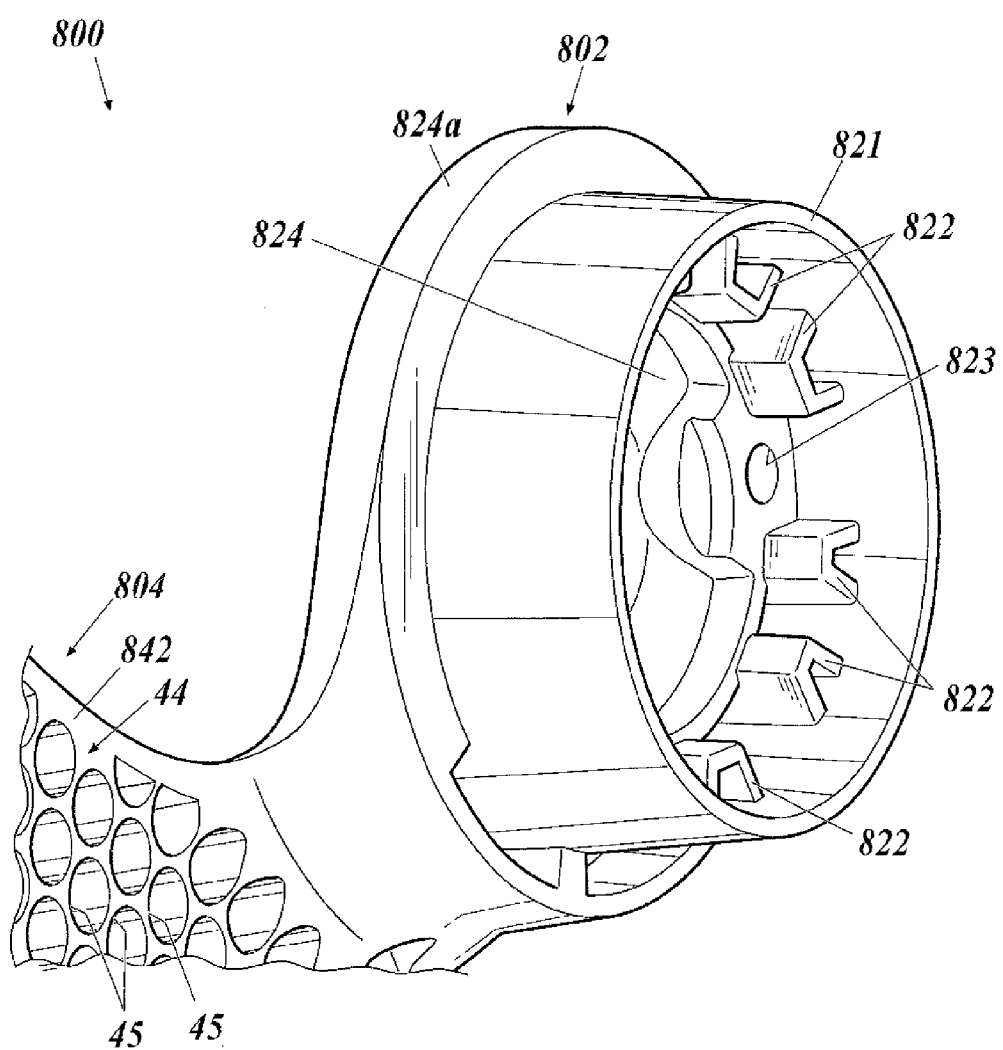
FIG. 7 is a partially enlarged perspective view of the operating lever according to the embodiment of the present invention.

With reference to FIGS. 5, 6, and 7, the operating lever 800 will now be described. FIG. 5 is a side view of the operating lever 800, viewed from the exterior of the seat body 10. FIG. 6 is a side view of the operating lever 800, viewed from the interior of the seat body 10. FIG. 7 is a partially enlarged perspective view of the operating lever 800.

The operating lever 800 includes a fixing portion 802, a handle (grip) 803 and an interface (arm) 804. The fixing portion 802 functions as a rotary axis of the operating lever 800. The fixing portion 802 is fixed to the power transmitter 8. The handle 803 is to be gripped by a user. The interface 804 is provided between the fixing portion 802 and the handle 803 and connects the handle 803 and the fixing portion 802. The operating lever 800 is made of resin. The fixing portion 802, handle 803, and the interface 804 are integrally formed of resin.

The fixing portion 802 includes a wall (shaft) 821, an outer portion 824, a pair of through-holes 823, a pair of recesses 825, and multiple engaging projections 822. The wall 821 has a cylindrical shape. The central axis of the wall 821 extends in the right-left direction. The wall 821 has right and left ends. The one end of the wall 821 is open. The other end of the wall 821 is covered with and blocked by the outer portion 824. The outer portion 824 forms the exterior. The multiple engaging projections 822 are disposed on the inner peripheral surface of the wall 821. The engaging projections 822 are disposed along the circumferential direction at predetermined intervals. The recesses 825 are formed on the front (exterior) of the outer portion 824. Each of the through-holes 823 receives a fixture, such as a screw, and is formed on the bottom of the recess 825. The through-hole 823 extends through the outer portion 824 to the interior of the wall 821. The outer portion 824 has an outer diameter concentric with the wall 821. The outer diameter of the outer portion 824 is larger than that of the wall 821. A flange 824a is formed along the periphery of the outer portion 824. The flange 824a extends radially outward from the outer peripheral surface of the wall 821.

The diameter of the wall 821 is smaller than that of the receiving recess 81j and that of the through-hole 81n. The wall 821 is inserted into the receiving recess 81j and the through-hole 81n from the exterior of the cover 81. The wall 821 partially protrudes from the through-hole 81n to the interior (back side) of the cover 81.

The opening at one end of the wall 821 is directed to the side of the seat body 10 and the side frame segment 31a. The power transmitter 8 is inserted into the opening of the wall 821. The wall 821 surrounds the entire circumference of the power transmitter 8. The bracket 8c of the power transmitter 8 engages with the engaging projections 822. A screw 89a has a shaft inserted into each through-hole 823 through the recess 825 from the front (exterior) of the outer portion 824. The shaft of the screw 89a is screwed into the bracket 8c. The head of the screw 89a is received in the recess 825. The wall 821 is thus fastened to the bracket 8c by the screws 89a. The operating lever 800 is thus coupled to the power transmitter 8.

The diameter of the flange 824a is smaller than that of the receiving recess 81j and larger than that of the through-hole 81n. The flange 824a is received in the receiving recess 81j. The flange 824a overlaps with the through-hole 81n and the flange 81m (bottom of the receiving recess 81j) in the axial direction (right-left direction). The flange 824a faces the flange 81m in the axial direction.

The outer portion 824 and the flange 824a do not protrude from the receiving recess 81j. The fronts of the outer portion 824 and the flange 824a are flush with the front of the cover 81 around the receiving recess 81j. In other words, the fronts of the outer portion 824 and the flange 824a are flush with the front of the first design panel 81a of the cover 81.

The interface 804 has a base end 804a connected to the front of the fixing portion 802. More specifically, the base end 804a of the interface 804 is connected to the lower part of the front of the outer portion 824, in particular, the flange 824a. The interface 804, the wall 821, and the outer portion 824 are integrally formed. In side view, the interface 804 extends forwardly from the lower part of the outer portion 824 and the flange 824a and is bent upward. In other words, the base end 804a of the interface 804 is continuous from the lower end of the fixing portion 802. The interface 804 extends upward gradually from the base end 804a.

In top view of the base end 804a of the interface 804, the base end 804a of the interface 804 protrudes from the fronts of the outer portion 824 and the flange 824a. The outer portion 824 and the flange 824a are reinforced by the base end 804a of the interface 804 to increase the rigidity of the outer portion 824 and the flange 824a.

The base end 804a of the interface 804 resides below a line connecting the pair of recesses 825 (the pair of through-holes 823) on the front of the outer portion 824 (see FIG. 5). The front of the outer portion 824 is gradually raised from the vertical center to the lower portion of the outer portion 824 to form the base end 804a of the interface 804 (see FIG. 2). This configuration allows an effective use of the space above the base end 804a of the interface 804 in the fronts of the outer portion 824 and the flange 824a. Furthermore, the base end 804a of the interface 804 can compensate the reduced rigidity of the outer portion 824 due to the formation of the through-holes 823 and the recesses 825, and can further increase the rigidity of the outer portion 824.

In top or bottom view of the interface 804, the base end 804a of the interface 804 protrudes from the fronts of the outer portion 824 and the flange 824a toward the exterior of the cover 81. The portion 804b closer to the front end than the base end 804a extends forwardly from the base end 804a.

In side view of the interface 804, the near-front end portion 804b of the interface 804 extends from the base end 804a of the interface 804 diagonally upward to the front. The near-front end portion 804b of the interface 804 is curved into an arch around a position above the near-front end portion 804b and then curved into a convex in the front downward direction.

The handle 803 extends forwardly from the front end of the interface 804. When the mechanical section of the power transmitter 8 keeps the input shaft 8b and the operating lever 800 at the original position (see FIG. 1), the handle 803 is kept in a horizontal position.

While the cover 81 is attached to the seat body 10 and the operating lever 800 is coupled to the power transmitter 8, the interface 804 and the handle 803 are disposed on the side of the cover 81. The interface 804 of the operating lever 800 faces and overlaps with the projections 81p and 81q in side view of the cover 81 and the operating lever 800. The back side of the interface 804 (see FIG. 6) may be in contact with or apart from the projections 81p and 81q. In the case of contact of the back side of the interface 804 (see FIG. 6) with the projections 81p and 81q, the back side surface of the interface 804 is apart from the front surface of the cover 81, in particular, the second design panel 81b, and thus, a gap exists between the back side of the interface 804 and the front of the cover 81.

As shown in FIGS. 5 and 6, the interface 804 includes an interface main body 841, an interface upper flange 842, an interface lower flange 843, a rib 844, cylindrical holes 845, and a weak portion (stress-concentrated portion) 846. The handle 803 includes a handle main body 831, a handle upper flange 832, a handle lower flange 833, an auxiliary flange 834, and multiple ribs 835.

The interface main body 841, the interface upper flange 842, the interface lower flange 843, the rib 844, the cylindrical holes 845, and the weak portion 846 of the interface 804 will now be described. The interface main body 841 is a lateral surface (wall) and extends from the base end 804a of the interface 804 diagonally upward to the front. The interface main body 841 extends from the base end 804a of the interface 804 to the front end of the interface 804 along a plane orthogonal to the input shaft 8b of the power transmitter 8. The plane orthogonal to the input shaft 8b of the power transmitter 8 is a plane parallel with the sheet of FIGS. 5 and 6.

The interface upper flange 842 extends from the upper edge of the interface main body 841 toward the interior of the seat body 10 and is erected with respect to the interface main body 841. The interface upper flange 842 is disposed along the upper edge of the interface main body 841. The interface lower flange 843 extends from the lower edge of the interface main body 841 toward the interior of the seat body 10 and is erected with respect to the interface main body 841. The interface lower flange 843 is disposed along the lower edge of the interface main body 841.

The rib 844 is disposed between the interface upper flange 842 and the interface lower flange 843 on the back side of the interface main body 841. The rib 844 protrudes from the back side of the interface main body 841 and is erected with respect thereto. The top of the rib 844 is flush with the protruding ends of the interface upper flange 842 and the interface lower flange 843. The multiple (a large number of) cylindrical holes 845 are formed on the rib 844. These cylindrical holes 845 are disposed in a grid. The rib 844 has a mesh shape. A short distance between adjacent cylindrical holes 845 enables a dense arrangement of the cylindrical holes 845.

The rib 844 is disposed on the back side of the interface main body 841 and extends from the base end 804a to the middle portion of the interface 804. The interface upper flange 842 of the rib 844 has one end 844a. The interface lower flange 843 of the rib 844 has one end 844b. The end 844a is closer to the front end of the interface 804 than the end 844b. The end 844a of the interface upper flange 842 of the rib 844 is further apart from a vertical line L1 extending through the rotary shaft of the power transmitter than the end 844b of the interface lower flange 843 of the rib 844. In short, the end 844a is further apart from the vertical line L1 than the end 844b. The distance a1 shown in FIG. 6 is a distance between the vertical line L1 and the end 844a. The distance b1 is a distance between the vertical line L1 and the end 844b. The distance a1 is greater than the distance b1.

The rib 844 of the interface 804 has higher rigidity than the near-front end portion. The boundary between the rib 844 and the near-front end portion, in particular, the root of the front end of the rib 844, is more likely to receive concentrated stress. The boundary is a weak portion 846. The weak portion 846 is weaker than any other part of the interface 804. Thus, the interface 804 is likely to deform at the weak portion 846. If a load higher than the maximum torque acceptable for the power transmitter 8 is applied to the interface 804, the weak portion 846 deforms. The weak portion 846 is formed between the rib 844 and the non-rib portion on the back side of the interface main body 841. Thus, in front view of the interface main body 841, the interface main body 841, the interface upper flange 842, and the interface lower flange 843 are continuous without any gap. In other words, the weak portion 846 resides at a portion other than the outer periphery of the interface 804.

If a load higher than the maximum torque acceptable for the power transmitter 8 is applied to the weak portion 846, the interface 804 deforms around the weak portion 846. The deformed interface 804 can prevent the application of torque exceeding the maximum torque to the input shaft 8b of the power transmitter 8. In other words, the weak portion 846 is designed to have rigidity as to deform by a load higher than the maximum torque acceptable for the power transmitter 8.

The handle main body 831, the handle upper flange 832, the handle lower flange 833, the auxiliary flange 834, and the multiple ribs 835 in the handle 803 will now be described. The handle main body 831 extends forwardly from the front end of the interface main body 841 of the interface 804. The handle main body 831 and the interface main body 841 are continuous. The handle main body 831 extends along a plane orthogonal to the input shaft 8b of the power transmitter 8. The handle upper flange 832 extends forwardly from the front end of the interface upper flange 842 of the interface 804. The handle upper flange 832 and the interface upper flange 842 are continuous. The handle upper flange 832 extends from the upper edge of the handle main body 831 toward the interior of the seat body 10. The handle upper flange 832 extends along the upper edge of the handle main body 831. The handle lower flange 833 extends forwardly from the front end of the interface lower flange 843 of the interface 804. The handle lower flange 833 and the interface lower flange 843 are continuous. The handle lower flange 833 extends from the lower edge of the handle main body 831 towards the interior of the seat body 10. The handle lower flange 833 extends along the lower edge of the handle main body 831. The auxiliary flange 834 extends downward from the lower edge of the handle lower flange 833. The auxiliary flange 834 is substantially parallel with the handle main body 831.

The multiple ribs 835 are disposed on the back side of the handle 803. In other words, the ribs 835 protrude from the back side of the handle main body 831 between the handle upper flange 832 and the handle lower flange 833. The ribs 835 extend vertically. These ribs 835 are disposed at predetermined intervals along the longitudinal direction of the handle 803.

The use and operation of the seat device 1 will now be described.

The mechanical section of the power transmitter 8 keeps the input shaft 8b and the operating lever 800 at the original position and keeps the handle 803 level (See FIG. 1). In side view of the interface 804, the interface 804 extends forwardly from the lower portions of the outer portion 824 and the flange 824a and is bent upward (See FIG. 1). The upper end of the handle 803 is above the upper end of the flange 824a.

A user grips the handle 803 and pulls up the handle 803 against the actuation force of the mechanical section of the power transmitter 8. This causes the fixing portion 802 of the operating lever 800 and the bracket 8c and the input shaft 8b of the power transmitter 8 to rotate. A torque of the input shaft 8b is transmitted by the mechanical section of the power transmitter 8 to the output shaft 8d. The transmitted torque drives the lifting mechanism 7 to raise the linkage members 71 and 72 of the lifting mechanism 7 forward and to lift up the seat body 10 and the bottom seat 3.

When a user releases the handle 803, the actuation force of the mechanical section of the power transmitter 8 causes the input shaft 8b to rotate to the original position. This returns the operating lever 800 to the original position and places the handle 803 in the horizontal position. The actuation force of the mechanical section of the power transmitter 8 is not transmitted to the output shaft 8d. The load from the lifting mechanism 7 to the output shaft 8d is received by the mechanical section of the power transmitter 8. Thus, at the release of the handle 803 by the user, the position of the output shaft 8d and the state of the lifting mechanism 7 are kept by the mechanical section of the power transmitter 8 and the seat body 10 and the bottom seat 3 are not lowered. When the user repeatedly pulls up the handle 803 from the original position, as described above, the linkage members 71 and 72 of the lifting mechanism 7 rise forward stepwise and the seat body 10 and the bottom seat 3 lift up stepwise.

Figure 8:
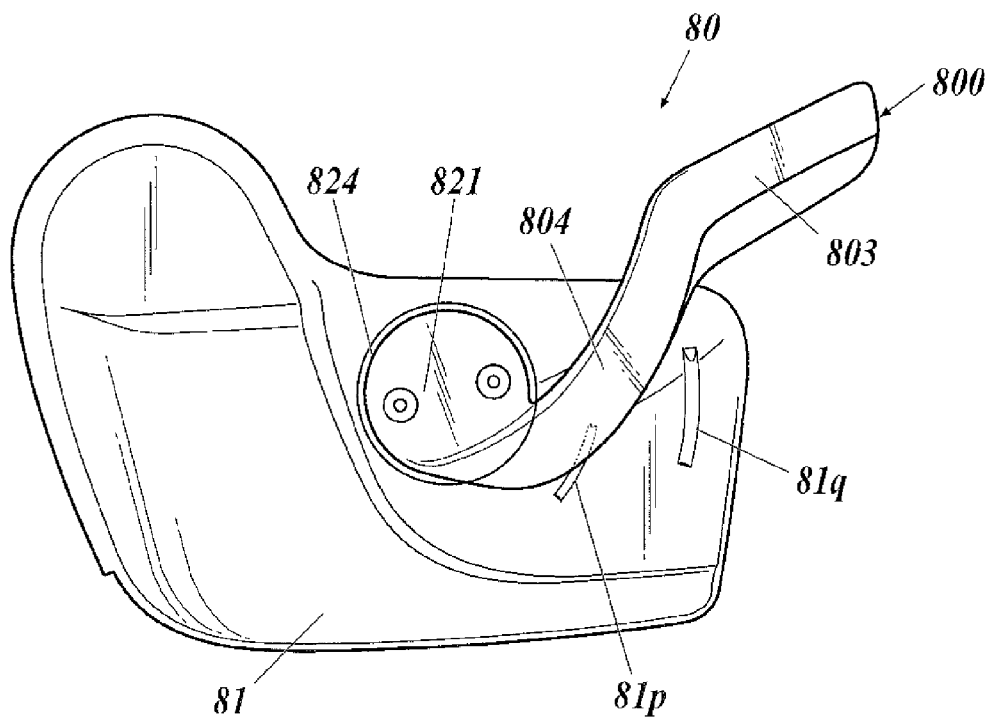
FIG. 8 is a side view of an operational structure according to the embodiment of the present invention.

FIG. 8 is a side view of the operating lever 800 at the highest position. As shown in FIG. 8, the interface 804 of the operating lever 800 overlaps with the first projection 81p even at the highest position of the operating lever 800 in side view of the cover 42 and the operating lever 800. At the highest position of the operating lever 800, the interface 804 of the operating lever 800 may be in contact with the first projection 81p. The second projection 81q may further extend upward. In this case, even at the highest position of the operating lever 800, the interface 804 of the operating lever 800 overlaps with the projections 81p and 81q in side view of the cover 42 and the operating lever 800.

A user pulls down the handle 803 against the actuation force of the mechanical section of the power transmitter 8 to rotate the fixing portion 802 of the operating lever 800 and the bracket 8c and the input shaft 8b of the power transmitter 8. The mechanical section of the power transmitter 8 transmits the torque of the input shaft 8b to the output shaft 8d. The transmitted torque drives the lifting mechanism 7 to lay down the linkage members 71 and 72 of the lifting mechanism 7 backward and to lower the seat body 10 and the bottom seat 3.

When a user releases the handle 803, the actuation force of the mechanical section of the power transmitter 8 causes the input shaft 8b to rotate to the original position. This returns the operating lever 800 to the original position and places the handle 803 in the horizontal position. The actuation force of the mechanical section of the power transmitter 8 is not transmitted to the output shaft 8d. The mechanical section of the power transmitter 8 receives the load from the lifting mechanism 7 to the output shaft 8d. Thus, at the release of the handle 803 by the user, the position of the output shaft 8d and the state of the lifting mechanism 7 are kept by the mechanical section of the power transmitter 8 and the seat body 10 and the bottom seat 3 are not lifted up. When the user repeatedly presses down the handle 803 from the original position, as described above, the linkage members 71 and 72 of the lifting mechanism 7 fall backward stepwise and the seat body 10 and the bottom seat 3 is lowered stepwise.

Figure 9:
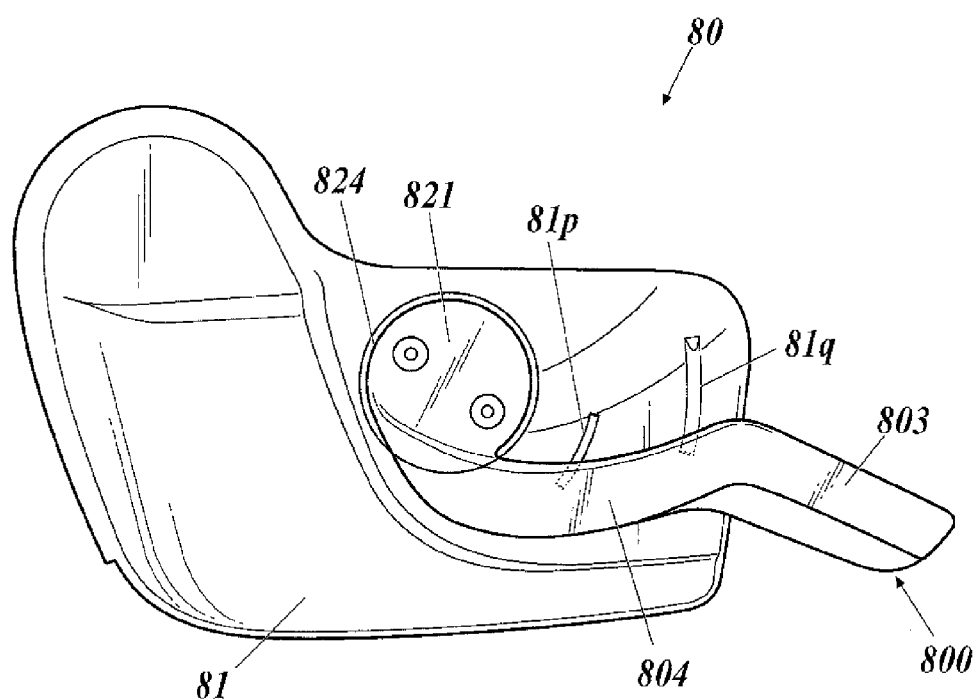
FIG. 9 is another side view of the operational structure according to the embodiment of the present invention.

FIG. 9 is a side view of the operating lever 800 at the lowest position. As shown in FIG. 9, at the lowest position of the operating lever 800, the interface 804 of the operating lever 800 overlaps with the projections 81p and 81q in side view of the cover 42 and the operating lever 800. The interface 804 of the operating lever 800 may be in contact with the projections 81p and 81q at the lowest position of the operating lever 800. One of the projections 81p and 81q may be short. In such a case, only one of the projections 81p and 81q overlaps with the operating lever 800 at the lowest position of the operating lever 800 in side view of the cover 42 and the operating lever 800.

If the back side surface of the operating lever 800 is in contact with the projections 81p and 81q, the operating lever 800 slides on the projections 81p and 81q during a vertical movement of the operating lever 800, as shown above.

If the back side surface of the operating lever 800 is apart from the projections 81p and 81q, the operating lever 800 may approach the front of the cover 81 during a vertical movement of the operating lever 800. When the operating lever 800 further approaches the front of the cover 81, the back side surface of the operating lever 800 comes into contact with the projections 81p and 81q.

When the handle 803 is pulled up by a force greater than the expected, the interface 804 deforms upwardly around the weak portion 846. The interface 804 twists around the center line along the extending direction thereof (See the arrow Y1 in FIGS. 5 and 6). This can prevent the application of torque exceeding the acceptable maximum torque to the power transmitter 8.

When the handle 803 is pressed down with a force greater than the expected, the interface 804 deforms downwardly around the weak portion 846.

The above embodiment of the present invention has the following advantageous effects.

(1) The weak portion 846, which is weaker than other portion, resides at a portion other than the outer periphery of the interface 804 connecting the fixing portion 802 and the handle 803. The weak portion 846 is designed to have such rigidity as to deform with load higher than the maximum torque acceptable for the power transmitter 8. Thus, at the application of force greater than the maximum load to the operating lever 800, the weak portion 846 deforms before the force is transmitted to the power transmitter 8.

Since the weak portion 846 resides at a portion other than the outer periphery of the interface 804, no gap is formed in the outer periphery of the interface 804 caused by the weak portion 846. This configuration can prevent an uncomfortable sense to the user during a normal operation.

The fixing portion 802, the handle 803, and the interface 804 are integrally formed of resin. This configuration can provide the operating lever 800 having a simpler structure than before.

(2) The interface 804 has the rib 844 between the interface upper flange 842 and the interface lower flange 843. The rib 844 extends from an end on a side nearer to the fixing portion 802 to the middle of the interface. This configuration can enhance the strength of the joint between the interface 804 and the fixing portion 802. Stress inevitably concentrates on the joint between the interface 804 and the fixing portion 802 during a normal operation. The enhanced strength of this portion increases the rigidity during a normal operation.

(3) A large number of cylindrical holes 845 are densely formed in the rib 844. This configuration can retain the strength of the rib 844 while reducing the amount of resin used.

(4) The handle 803 has the auxiliary flange 834. The auxiliary flange 834 extends from the lower end of the handle lower flange 833 and is substantially parallel with the handle main body 831. The auxiliary flange 834 can enhance the overall rigidity of the handle 803 and thus the strength of the handle 803.

(5) The two projections 81*p* and 81*q*, which reside on the front surface of the cover 81, can prevent a large-area contact of the operating lever 800 with the front of the cover 81. In other words, the projections 81*p* and 81*q* can prevent a surface contact between the front of the cover 81 and the operating lever 800. This configuration can reduce or eliminate friction between the cover 81 and the operating lever 800 during a vertical movement of the operating lever 800 to ensure a further smoother movement of the operating lever 800.

(6) The contact of the operating lever 800 with the projections 81*p* and 81*q* can prevent right-and-left vibrations of the operating lever 800 around the fixing portion 802. This configuration ensures a stable and smooth movement of the operating lever 800.

(7) While the operating lever 800 is in contact with the projections 81*p* and 81*q*, the back side surface of the operating lever 800 is not wholly in contact with the front of the cover 81, but partially in contact with the projections 81*p* and 81*q*. This configuration reduces friction of the operating lever 800 and enables a vertical movement of the operating lever 800 with a light force to enhance the mobility of the operating lever 800.

(8) The operating lever 800 extends forwardly from the fixing portion 802. The rear portion of the operating lever 800 overlaps with the first projection 81*p* in side view. The front portion of the operating lever 800 overlaps with the second projection 81*q*. This configuration can further prevent a large-area contact of the operating lever 800 with the front of the cover 81. The contact of the rear portion of the operating lever 800 with the first projection 81*p* and the contact of the front portion of the operating lever 800 with the second projection 81*q* can prevent extensive right-and-left vibrations of the operating lever 800 around the fixing portion 802. This configuration ensures a smoother movement of the operating lever 800.

(9) The upper end of the projection 81*p* is vertically offset from the upper end of the projection 81*q*. The lower end of the projections 81*p* is vertically offset from the lower end of the projection 81*q*. The vertical range of the first projection 81*p* differs from that of the second projection 81*q*. This enables a stable and smooth movement of the operating lever 800 even if the range of a vertical movement of the operating lever 800 differ between the front portion and the rear portion of the operating lever 800.

(10) Since the upper end of the second projection 81*q* is above the upper end of the first projection 81*p*, the operating lever 800 overlaps with the second projection 81*q*, even if the operating lever 800 curves upward while extending forwardly. This configuration can expand the noncontact area of the operating lever 800 with the front of the cover 81 and thus the smoothly movable area of the operating lever 800.

(11) When the operating lever 800 is at the original position, the operating lever 800 hides the first projection 81*p*. This configuration enhances the appearance or aesthetic properties of the cover 81.

(12) When the operating lever 800 is at the original position, the operating lever 800 partially hides the second projection 81*q*, but partially exposes it below the lower edge of the operating lever 800. This configuration makes the second projection 81*q* less conspicuous and enhances the appearance or aesthetic properties of the cover 81.

(13) The operating lever 800 overlaps with the first projection 81*p* even at the highest position of the operating lever 800. This configuration can expand the noncontact area of the operating lever 800 with the front of the cover 81 to the upper limit (top dead point). This configuration ensures a stable and smooth movement of the operating lever 800 from the original position to the upper limit.

(14) The projections 81*p* and 81*q* are in contact with the operating lever 800 even at the lowest position of the operating lever 800. This configuration can expand the noncontact area of the operating lever 800 with the front of the cover 81 to the lower limit (bottom dead point). This configuration ensures a stable and smooth movement of the operating lever 800 from the original position to the lower limit.

(15) The multiple cylindrical holes 845 disposed in a grid form the mesh rib 844. This configuration facilitates the fabrication of the rib 844. The rib 844 enhances the rigidity of the operating lever 800.

(16) The wall 821 of the operating lever 800 is inserted into the receiving recess 81*j* and the through-hole 81*n*. This configuration can prevent the entry of dust from the exterior of the cover 81 into the interior of the cover 81 through the receiving recess 81*j* and the through-hole 81*n*. The receiving recess 81*j*, which resides on the front surface of the cover 81, can enhance the rigidity of the cover 81. Although the through-hole 81*n* reduces the rigidity of the cover 81, the cylindrical wall 81*k* surrounding the receiving recess 81*j* can compensate the reduced rigidity and further increase the rigidity.

(17) The flange 824*a* of the operating lever 800 overlaps with the bottom (flange 81*m*) of the receiving recess 81*j* to block the through-hole 81*n*. This configuration can prevent the entry of dust from the exterior of the cover 81 into the interior of the cover through the receiving recess 81*j* and the through-hole 81*n*.

(18) The flange 824*a*, which is accommodated in the receiving recess 81*j*, fills the gap in the receiving recess 81*j*. This configuration can prevent the entry of dust from the exterior of the cover 81 into the interior of the cover 81 through the receiving recess 81*j* and the through-hole 81*n*.

(19) The outer portion 824 and the flange 824*a* are accommodated in the receiving recess 81*j*. This configuration can simplify the structure of the exterior of the cover 81 and allows an effective use of the exterior of the cover 81. The fronts of the outer portion 824 and the flange 824*a* are flush with the front of the cover 81 around the receiving recess 81*j*. This configuration can simplify the structure of the exterior of the cover 81 and thus can reduce the size of the operational structure 80.

(20) The base end 804*a* of the interface 804 of the operating lever 800 protrudes from the lower portion of the fronts of the outer portion 824 and the flange 824*a* toward the exterior of the cover 81. This allows an effective use of the space above the base end 804*a* of the interface 804 in the fronts of the outer portion 824 and the flange 824*a*.

(21) The portion 804*b* closer to the front end than the base end 804*a* of the interface 804 extends from the base end 804*a* diagonally upward to the front. The handle 803 is connected to the front end of the interface 804 (See FIGS.

1, 5, and 6). This configuration facilitates the gripping of the handle 803 by a user seated on the seat body 10.

(22) The upper end of the handle 803 is above the upper end of the flange 824a (See FIG. 5). This configuration facilitates gripping of the handle 803 by a user and improves the operability of the operating lever 800 when the user grips the handle 803 and pulls up the operating lever 800.

(23) The weak portion 846 resides at the middle between the base end and the front end of the interface 804 (see FIG. 6). This configuration can prevent the application of a load higher than the expected load to the power transmitter 8 even at the operation of the operating lever 800 with such a load.

(24) The wall 821 protrudes toward the interior of the cover 81. This configuration can simplify the structure of the exterior of the cover 81 and thus can reduce the size of the operational structure 80.

[Modification]

The embodiment of the present invention is not limited to the above embodiment and various changes and modifications can be made without departing from the spirit and scope of the present invention. The following description focuses on several modifications. The following modifications may be combined according to demand.

[Modification 1]

In the above embodiment, the operational structure 80 is disposed on the side of the bottom seat 3. Alternatively, the operational structure 80 may be disposed on the side of the backrest 2. In other words, the power transmitter 8 may be disposed on the side of the frame 21 and the cover 81 may cover the side of the frame 21. In this configuration, the wall 821 of the operating lever 800 may be inserted into the receiving recess 81j and the through-hole 81n of the cover 81 and thus attached to the bracket 8c of the power transmitter 8.

[Modification 2]

In the above embodiment, the operating lever 800 is rotated about the wall 821 and the power transmitter 8 to transmit the power to the seat body 10 via the power transmitter 8 and the lifting mechanism 7, thereby lifting up or lowering the seat body 10. The operation of the operating lever 800 is not limited to the ascending or descending of the seat body 10. For example, the operating lever 800 may be rotated to ascend or descend the front of the bottom seat 3, thereby adjusting the inclination of the bottom seat 3. Alternatively, the operating lever 800 may be rotated to move a lumber support provided in the backrest 2 in the front-back direction. Alternatively, the operating lever 800 may be rotated to open or close a pair of banks disposed on the right and left sides of the front of the backrest 2. Alternatively, the operating lever 800 may be rotated to open or close a pair of banks disposed on the right and left sides of the top of the bottom seat 3. In any case, the output shaft 8d or the drive gear 8e of the power transmitter 8 is coupled to an operating section of the seat body 10.

[Modification 3]

Figure 10:
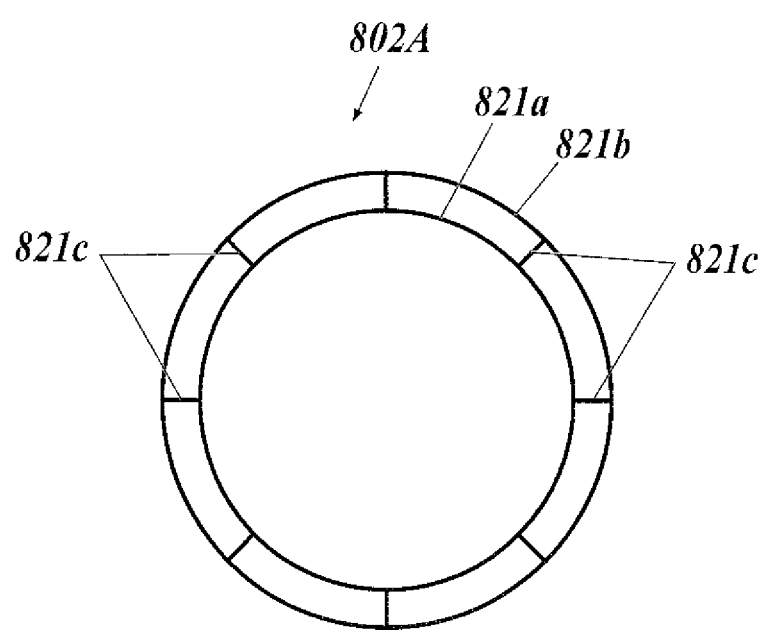
FIG. 10 is a partial schematic view of an operating lever according to a modification.

In the above embodiment, the fixing portion 802 has a single wall 821. Alternatively, the wall 821 may be double or more. FIG. 10 is a schematic rear view of a fixing portion 802A having a double wall 821a and 821b, which is a substitution of the fixing portion 802. As shown in FIG. 10, the fixing portion 802A includes a first wall 821a and a second wall 821b. The first wall 821a surrounds the entire circumference of the power transmitter 8. The second wall 821b surrounds the entire circumference of the first wall 821a. Multiple ribs 821c are disposed between the first wall 821a and the second wall 821b such that the ribs 821c are continuous from the first wall 821a and the second wall 821b. The ribs 821c are disposed along the circumferential direction.

The multiple ribs 821c, which are disposed between the first wall 821a surrounding the entire circumference of the power transmitter 8 and the second wall 821b surrounding the entire circumference of the first wall 821a such that the ribs 821c are continuous from the first wall 821a and the second wall 821b, can enhance the rigidity of the fixing portion 802A itself and ensure a smooth transmission of power to the power transmitter during a normal operation.

INDUSTRIAL APPLICABILITY

The present invention may be applied to car seat devices, vehicle seat devices, and other seat devices equipped with an operating lever.

DESCRIPTION OF REFERENCE NUMERALS 1 seat device
10 seat body
80 operational structure
81 cover
81p first projection
81q second projection
800 operating lever
802 fixing portion
803 handle
804 interface
821 wall
822 engaging projection
823 through-hole
824 outer portion
831 handle main body
832 handle upper flange
833 handle lower flange
834 auxiliary flange
835 rib
841 interface main body
842 interface upper flange
843 interface lower flange
844 rib
844a end
844b end
845 cylindrical hole
846 weak portion

The invention claimed is:

1. An operating lever comprising:
a fixing portion to be fixed to a power transmitter;
a handle to be griped by a user; and
an interface connecting the fixing portion and the handle, wherein
the fixing portion, the handle, and the interface are integrally formed;
the interface has a weak portion at a portion other than an outer periphery of the interface, the weak portion being weaker than other portions,
the interface includes:
an interface main body along a plane orthogonal to a rotary shaft of the power transmitter;
an interface upper flange erected from an upper edge of the interface main body;
an interface lower flange erected from a lower edge of the interface main body; and
a rib residing between the interface upper flange and the interface lower flange, the rib extending from an end of the interface on a side nearer to the fixing portion to a middle of the interface, multiple holes are formed next to each other in the rib, whereby the weak portion is formed in the vicinity of an end of the multiple holes on a side nearer to the handle, and the holes on a side of the interface upper flange are located nearer to the handle than the holes on a side of the interface lower flange.

2. The operating lever according to claim 1, wherein: the fixing portion, the handle and the interface are composed of resin; and an end of the rib on a side nearer to the interface upper flange is more apart from a vertical line extending through the rotary shaft of the power transmitter than an end of the rib on a side nearer to the interface lower flange.

3. The operating lever according to claim 1, wherein the handle comprises:

a handle main body continuous from the interface main body, the handle main body being along the plane orthogonal to the rotary shaft of the power transmitter;

a handle upper flange continuous from the interface upper flange, the handle upper flange being erected from an upper edge of the handle main body;

a handle lower flange continuous from the interface lower flange, the handle lower flange erected from a lower edge of the handle main body; and an auxiliary flange extending from a lower end of the handle lower flange and being substantially parallel with the handle main body.

4. The operating lever according to claim 1, wherein the fixing portion comprises a first wall surrounding the entire circumference of the power transmitter and a second wall surrounding the entire circumference of the first wall, and wherein multiple ribs are provided between the first wall and the second wall at predetermined intervals and continuous from the first wall and the second wall.

5. An operational structure, comprising:

an operating lever;

a cover covering a side of a seat body; and multiple projections residing on a front surface of the cover, wherein the operating lever includes:
    a fixing portion to be fixed to a power transmitter;
    a handle to be griped by a user; and
    an interface connecting the fixing portion and the handle, the fixing portion, the handle, and the interface are integrally formed;

the interface has a weak portion at a portion other than an outer periphery of the interface, the weak portion being weaker than other portions, the operating lever is mounted on the cover and is movable vertically along the front surface of the cover; and the operating lever overlaps with the multiple projections when viewed from a side of the cover and the operating lever.

6. The operational structure according to claim 5, wherein the operating lever extends forwardly along the front surface of the cover from a fulcrum of a vertical movement of the operating lever, and wherein the multiple projections comprise:
    a first projection disposed on the front surface of the cover forward of the fulcrum and extending vertically; and
    a second projection disposed on the front surface of the cover forward of the first projection and extending vertically.

7. The operational structure according to claim 6, wherein an upper end of the first projection is vertically offset from an upper end of the second projection.

8. The operational structure according to claim 7, wherein the operating lever is curved upward while extending forwardly; and the upper end of the second projection is above the upper end of the first projection.

9. The operational structure according to claim 6, wherein a lower end of the first projection is vertically offset from a lower end of the second projection.

10. The operational structure according to claim 5, wherein the operating lever extends forwardly along the front surface of the cover from a fulcrum of a vertical movement of the operating lever;

the operating lever is movable vertically from an original position and is urged so as to return to the original position;

the multiple projections extend vertically; and the operating lever hides at least one of the multiple projections and partially exposes the at least one of the multiple projections extending below the operating lever at the original position of the operating lever.

11. The operational structure according to claim 5, wherein the operating lever extends forwardly along the front surface of the cover from a fulcrum of a vertical movement of the operating lever;

the operating lever is movable vertically from an original position;

the multiple projections extend vertically; and the operating lever overlaps with at least one of the multiple projections even at the highest position of the operating lever when viewed from the side of the cover and the operating lever.

12. The operational structure according to claim 5, wherein the operating lever extends forwardly along the front surface of the cover from a fulcrum of a vertical movement of the operating lever;

the operating lever is movable vertically from an original position;

the multiple projections extend vertically; and the operating lever overlaps with at least one of the multiple projections even at the lowest position of the operating lever when viewed from the side of the cover and the operating lever.

13. A seat device comprising:

a seat body; and the operational structure according to claim 5.

* * * * *